(12) United States Patent
Darmer

(10) Patent No.: US 11,898,717 B2
(45) Date of Patent: Feb. 13, 2024

(54) LIGHT ASSEMBLY THAT EMITS A NARROW, UNATTENUATED LIGHT BEAM AND ATTENUATED LIGHT OVER BROAD ANGLES

(71) Applicant: HONEYWELL INTERNATIONAL INC., Charlotte, NC (US)

(72) Inventor: Garrett Darmer, Tucson, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 213 days.

(21) Appl. No.: 17/647,027

(22) Filed: Jan. 5, 2022

(65) Prior Publication Data

US 2023/0213166 A1 Jul. 6, 2023

(51) Int. Cl.
| | |
|---|---|
| F21S 43/50 | (2018.01) |
| B64D 47/06 | (2006.01) |
| F21S 43/20 | (2018.01) |
| F21Y 115/10 | (2016.01) |
| F21W 103/10 | (2018.01) |
| F21W 107/30 | (2018.01) |
| F21Y 113/13 | (2016.01) |

(52) U.S. Cl.
CPC .............. *F21S 43/50* (2018.01); *B64D 47/06* (2013.01); *F21S 43/26* (2018.01); *B64D 2203/00* (2013.01); *F21W 2103/10* (2018.01); *F21W 2107/30* (2018.01); *F21Y 2113/13* (2016.08); *F21Y 2115/10* (2016.08)

(58) Field of Classification Search
CPC ............ F21S 43/50; F21S 43/26; B64D 47/06
See application file for complete search history.

(56) References Cited

U.S. PATENT DOCUMENTS

| | | | |
|---|---|---|---|
| 5,722,758 A * | 3/1998 | Huang | F21S 43/19 362/311.06 |
| 8,616,734 B2 | 12/2013 | Olsson et al. | |
| 9,745,079 B2 | 8/2017 | Jha | |
| 10,288,260 B2 | 5/2019 | Tsukatani et al. | |
| 10,464,692 B2 * | 11/2019 | Jha | B64D 47/02 |
| 2005/0190564 A1 * | 9/2005 | Amano | F21S 43/14 362/336 |
| 2009/0010013 A1 | 1/2009 | Hessling | |
| 2011/0261577 A1 * | 10/2011 | Kohlmeier-Beckmann | F21S 43/14 362/545 |
| 2011/0320024 A1 * | 12/2011 | Lin | F21V 5/007 703/2 |
| 2018/0016032 A1 * | 1/2018 | Jha | B64D 47/02 |

(Continued)

FOREIGN PATENT DOCUMENTS

| | | |
|---|---|---|
| KR | 101269033 B1 | 6/2013 |
| KR | 20200139615 A | 12/2020 |

*Primary Examiner* — Bryon T Gyllstrom
(74) *Attorney, Agent, or Firm* — LORENZ & KOPF, LLP

(57) ABSTRACT

A light assembly includes a housing, a light emitting diode (LED), and a hemispherical dome. The housing has a lens mounted thereon. The light LED is mounted within the housing and operable to emit light within a predetermined range of wavelengths and at an emission intensity toward the lens. The hemispherical dome mounted is within the housing between the LED and the lens. The hemispherical dome comprises a material that attenuates the emission intensity by a predetermined magnitude, and has an aperture formed therein and through which a portion of the light emitted from the LED may pass unattenuated.

20 Claims, 4 Drawing Sheets

(56) References Cited

U.S. PATENT DOCUMENTS

| | | | |
|---|---|---|---|
| 2021/0215804 A1* | 7/2021 | Liu | G01S 7/4817 |
| 2022/0119091 A1* | 4/2022 | Graf | H01Q 1/282 |
| 2022/0128212 A1* | 4/2022 | Shibayama | F21S 43/14 |
| 2022/0334454 A1* | 10/2022 | Veit | G02B 13/06 |

* cited by examiner

LIGHT ASSEMBLY THAT EMITS A NARROW, UNATTENUATED LIGHT BEAM AND ATTENUATED LIGHT OVER BROAD ANGLES

TECHNICAL FIELD

The present invention generally relates to a light assembly, and more particularly relates to a light assembly that emits a narrow, unattenuated light beam and attenuated light over broad angles.

BACKGROUND

Many vehicles are equipped with various types of light assemblies. For example, some aircraft are equipped with, for example, navigation lights, taxi lights, position lights and, in some instances, formation lights. Depending on the particular vehicle, one or more of these lights may need to meet certain functional requirements. For example, one or more lights may need to be able to simultaneously emit a narrow, unattenuated light beam and attenuated light over broad angles.

Various solutions have been proposed for meeting the above-mentioned functional requirements. One solution includes selectively masking a curved lens with a thin film. Another solution would rely on a cup-style reflector to redirect light. Although potentially effective, these solutions suffer certain drawbacks. In particular, each solution presents manufacturing complexities, which can increase overall costs, the curved lens solution is susceptible to degradation, and the reflector solution is relatively large and does not perform as needed.

Hence, there is a need for a light assembly that is able to simultaneously emit a narrow, unattenuated light beam and attenuated light over broad angles that does not rely on complex manufacturing techniques, is less susceptible to degradation, and can be manufactured to fit within a relatively small size envelope. The present invention meets at least these need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a light assembly includes a housing, a light emitting diode (LED), and a hemispherical dome. The housing has a lens mounted thereon. The light LED is mounted within the housing and operable to emit light within a predetermined range of wavelengths and at an emission intensity toward the lens. The hemispherical dome mounted is within the housing between the LED and the lens. The hemispherical dome comprises a material that attenuates the emission intensity by a predetermined magnitude, and has an aperture formed therein and through which a portion of the light emitted from the LED may pass unattenuated.

In another embodiment, an aircraft position light assembly includes a housing, an infrared light emitting diode (IRLED), a plurality of non-IR LEDs and a hemispherical dome. The housing has a lens mounted thereon. The IRLED is mounted within the housing and is operable to emit IR light at an emission intensity toward the lens. The non-IR LEDs are mounted within the housing and are spaced apart from the IRLED. Each non-IR LED is operable to emit visible light in a direction away from the lens. The hemispherical dome is mounted within the housing between the IRLED and the lens. The hemispherical dome comprises a material that attenuates the emission intensity by a predetermined magnitude, the hemispherical dome having an apex and an axis of symmetry that extends through the apex, and further having an aperture formed therein and through which a portion of the IR light emitted from the IRLED may pass unattenuated, the aperture disposed at a predetermined angle relative to the axis of symmetry.

In yet another embodiment, a light assembly includes a housing, a light emitting diode (LED), and a hemispherical dome. The housing has a lens mounted thereon. The LED is mounted within the housing and is operable to emit light within a predetermined range of wavelengths and at an emission intensity toward the lens. The hemispherical dome is mounted within the housing between the LED and the lens. The hemispherical dome comprises a material that attenuates the emission intensity by a predetermined magnitude and has an aperture formed therein and through which a portion of the light emitted from the LED may pass unattenuated. The aperture has a predetermined diameter.

Furthermore, other desirable features and characteristics of the light assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
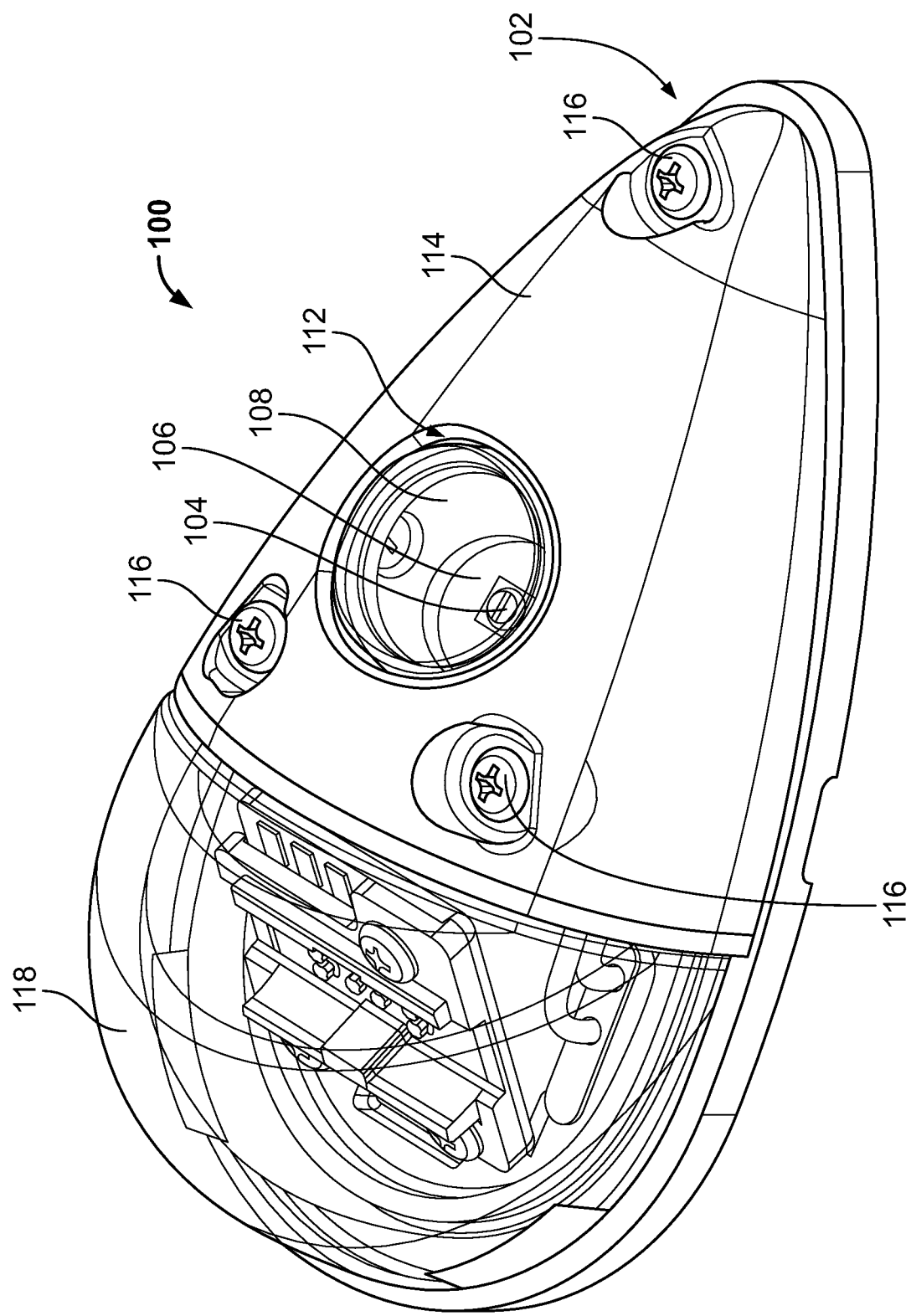
FIG. 1 is a plan view of one embodiment of a light assembly with a cover portion not visible.

Referring to FIG. 1 a plan view of one embodiment of a light assembly 100 is depicted. The depicted light assembly 100 includes at least a housing 102, a light emitting diode (LED) 104, and a hemispherical dome 106. The housing 102 has a lens 108 mounted thereon. More specifically, at least in the depicted embodiment, the lens 108 is disposed in a lens opening 112 that is formed in an opaque cover 114, which is coupled to the housing 102 via, for example, suitable fastener hardware 116. As FIG. 1 further depicts, the depicted light assembly 100 may additionally include a transparent cover 118. When included, the opaque cover 114 abuts a portion of the transparent cover 118, helping to hold it in place.

The configuration of the housing 102 may vary. In the depicted embodiment, and as FIG. 2 more clearly depicts, the housing 102 includes an attachment portion 103 and a mount portion 105. The attachment portion 103 is adapted to attach the housing 102 to a vehicle (not illustrated). The mount portion 105 extends from, and has a mount surface 107 that is disposed at a first predetermined angle ($\alpha_1$) relative to, the attachment portion 103. A printed circuit board 109 is coupled to the mount portion 105.

Figure 2:
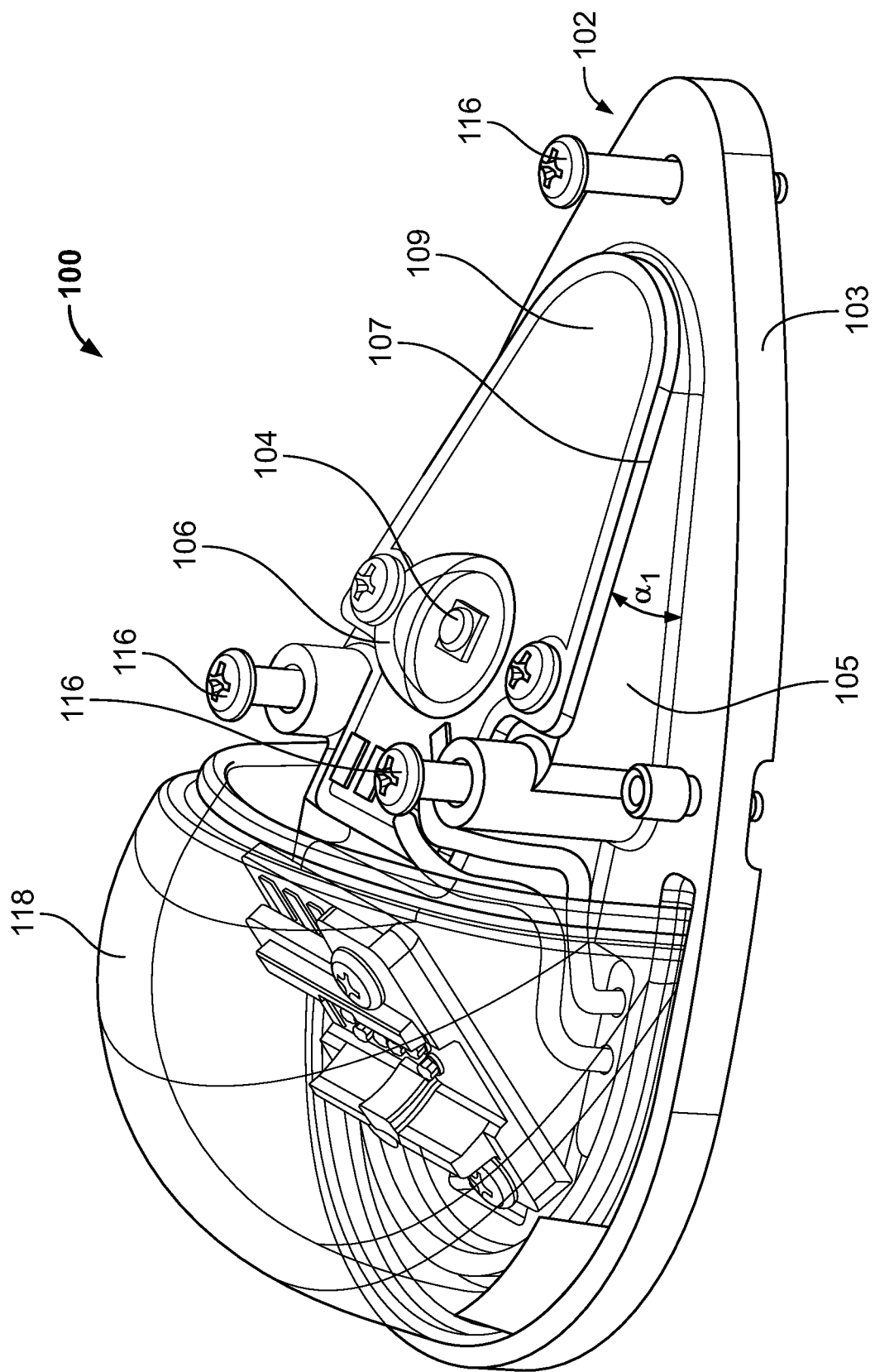
FIG. 2 is a plan view of the light assembly of FIG. 1 with the cover portion visible.

With continued reference to FIG. 2, it is seen that the LED 104 is mounted within the housing 102. More specifically, the LED 104, at least in the depicted embodiment, is coupled to the mount portion 105, and even more specifically, is connected to the printed circuit board 109. The LED 104 is operable, upon being energized, to emit light within a predetermined range of wavelengths and at an emission intensity toward the lens 108. It will be appreciated that the predetermined range of wavelengths and the emission intensity may vary depending, for example, on the type of LED and the functional requirements and/or specifications. In one particular embodiment, in which the light assembly is used as an aircraft formation light, the LED is an infrared LED (IRLED), and thus the predetermined range of wavelengths is within the IR range, and the emission intensity is about 0.009 W/sr (or greater). Again, these are just example emission wavelengths and intensities, which may vary, as needed or desired.

Figure 3:
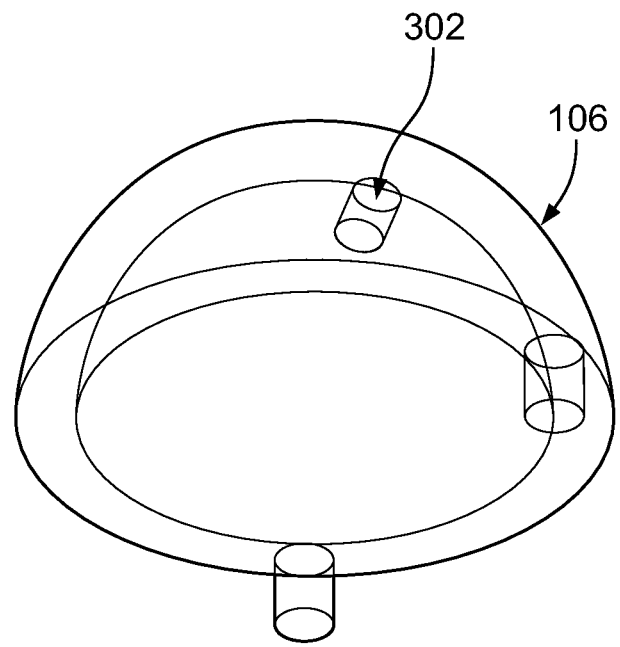
FIG. 3 is a plan view of one embodiment of a hemispherical dome that may be used in the light assembly of FIGS. 1 and 2.
Figure 4:
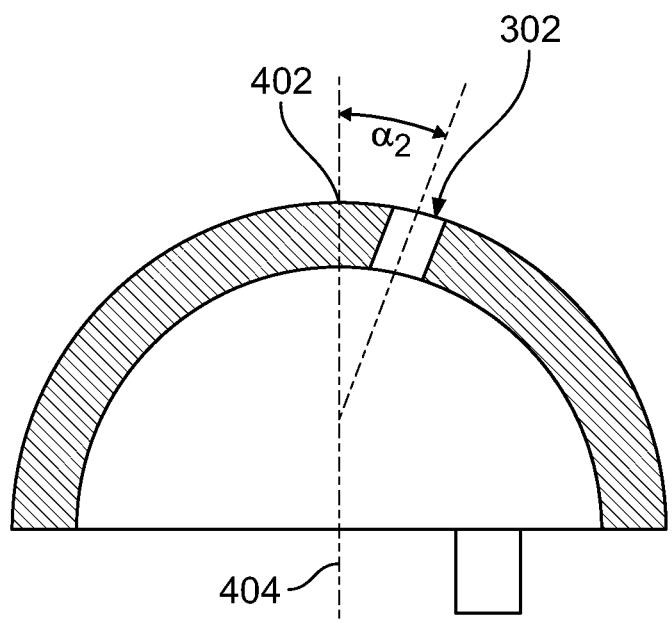
FIG. 4 is a cross section view of the hemispherical dome taken along line 4-4 in FIG. 3.

The hemispherical dome 106, an embodiment of which is shown more clearly in FIGS. 3 and 4, is also mounted within the housing 102 and is disposed between the LED 104 and the lens 108. In the depicted embodiment, it is mounted on the printed circuit board 109, and comprises a material that attenuates, by a predetermined magnitude, the emission intensity of the light emitted by the LED 104. To provide this functionality, the hemispherical dome 106 is made of a thermoplastic resin that is embedded with a thermoplastic dye. The specific thermoplastic resin and thermoplastic dye may vary depending, for example, on the emission wavelengths of the LED and the desired attenuation magnitude. One specific example of a suitable thermoplastic resin embedded with a suitable dye includes, but is not limited to, Luminate™7812, manufactured by Epolin of Newark, NJ, just to name one non-limiting example.

No matter the specific thermoplastic resin and thermoplastic dye that are used, the hemispherical dome 106 additionally has an aperture 302 formed therein. As such, a portion of the light emitted from the LED may pass, unattenuated, through the aperture 302. Preferably, the aperture 302 is disposed at a predetermined angle and has a predetermined diameter. In particular, and as FIG. 4 shows most clearly, the hemispherical dome 106 has an apex 402 and an axis of symmetry 404 that extends through the apex 402. The aperture 302 is disposed at a second predetermined angle ($\alpha_2$) relative to the axis of symmetry 402. It will be appreciated that the second predetermined angle ($\alpha_2$) and the predetermined diameter may vary depending, for example, on the desired angle at which the unattended beam should pass and on the desired width of the unattended beam.

Returning again to FIGS. 1 and 2, it is seen that the light assembly 100 may additionally include a plurality of non-IR LEDs. That is, LEDs that are operable, when energized, to emit visible light. The non-IR LEDS, when included, are mounted within the housing and are spaced apart from the IRLED and are disposed such that the visible light emitted from the non-IR LEDs passes through the transparent cover 118. With this configuration, the light assembly 100 may be used to selectively emit visible light or IR light or both, as needed or desired.

Figure 5:
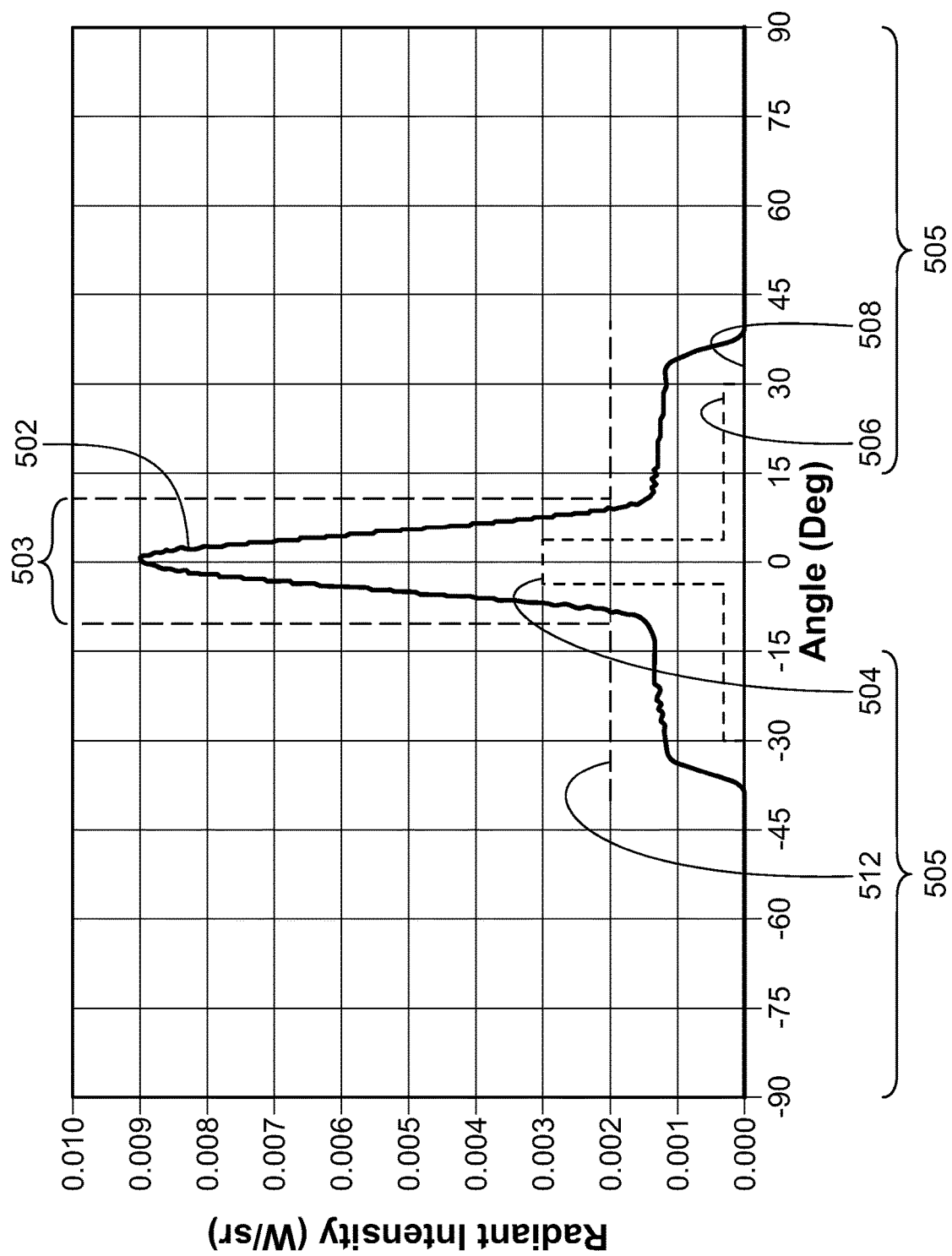
FIG. 5 graphically depicts the performance of the light assembly of FIGS. 1 and 2 as compared to an example performance specification.

The configuration and implementation of the hemispherical dome 106 allows the light assembly 100 to emit, from the LED 104, a narrow, unattenuated light beam, while simultaneously attenuating the emitted light over broad angles. For example, and as graphically depicted in FIG. 5, the light assembly 100 will emit an unattenuated light beam, having an intensity 502 that is above a first predetermined minimum intensity 504, over a relatively narrow angular range 503, while simultaneously attenuating the light beam over a broad angular range 505, such that the intensity is above a second and a third predetermined minimum intensity 506, 508 and below a predetermined maximum intensity 512. The narrow and broad angular ranges 503, 505, and the amount of attenuation may vary and may depend, for example, on the diameter of the aperture 302, the second predetermined angle ($\alpha_2$), the specific thermoplastic material, and the specific thermoplastic dye, just to name a few variables.

The light assembly 100, and more specifically the hemispherical dome 106, utilizes material properties to influence photometric performance, thereby greatly reducing its complexity. This leads to lower part cost, quick turn-around times, and greater performance. The relatively simple design of the hemispherical dome 106 leads to ease of manufacturing. The hemispherical dome 106 also enables favorable tolerances that can easily be obtained, and the aperture 302 can be disposed at various angles, allowing unattenuated light to escape at a specified angle while maintaining a focused and sharp peak to meet a desired performance requirement.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A light assembly, comprising:
    a housing having a lens mounted thereon;
    a light emitting diode (LED) mounted within the housing, the LED operable to emit light within a predetermined range of wavelengths and at an emission intensity toward the lens; and
    a hemispherical dome mounted within the housing between the LED and the lens, the hemispherical dome comprising a material that attenuates the emission intensity by a predetermined magnitude, the hemispherical dome having an aperture formed therein and through which a portion of the light emitted from the LED may pass unattenuated.

2. The light assembly of claim 1, wherein:
    the hemispherical dome has an apex and an axis of symmetry that extends through the apex; and
    the aperture is disposed at a predetermined angle relative to the axis of symmetry.

3. The light assembly of claim 2, wherein the aperture has a predetermined diameter.

4. The light assembly of claim 1, wherein the hemispherical dome comprises a thermoplastic resin embedded with a thermoplastic dye.

5. The light assembly of claim 1, wherein the predetermined range of wavelengths is an infrared wavelength range.

6. The light assembly of claim 1, wherein:
    the LED is an infrared LED (IRLED) that emits IR light; and
    the light assembly further comprises a plurality of non-IR LEDs mounted within the housing and spaced apart from the IRLED, each of non-IR LEDs operable to emit visible light.

7. The light assembly of claim 6, further comprising:
    a transparent cover coupled to the housing and disposed such that the visible light emitted from the non-IR LEDs passes therethrough.

8. The light assembly of claim 7, further comprising:
    an opaque cover coupled to the housing and abutting a portion of the transparent cover, the opaque cover having a lens opening formed therein in which the lens is disposed.

9. The light assembly of claim 1, wherein:
    the housing includes an attachment portion and a mount portion;
    the attachment portion is adapted to attach the housing to a vehicle;
        the mount portion extends from, and has a mount surface that is disposed at a predetermined angle relative to, the attachment portion; and
    the LED is coupled to the mount portion.

10. The light assembly of claim 9, further comprising:
    a printed circuit board disposed on the mount surface and having the LED connected thereto.

11. An aircraft position light assembly, comprising:
    a housing having a lens mounted thereon;
    an infrared light emitting diode (IRLED) mounted within the housing, the IRLED operable to emit IR light at an emission intensity toward the lens;
    a plurality of non-IR LEDs mounted within the housing and spaced apart from the IR LED, each of non-IR LEDs operable to emit visible light in a direction away from the lens; and
    a hemispherical dome mounted within the housing between the IRLED and the lens, the hemispherical dome comprising a material that attenuates the emission intensity by a predetermined magnitude, the hemispherical dome having an apex and an axis of symmetry that extends through the apex, and further having an aperture formed therein and through which a portion of the IR light emitted from the IRLED may pass unattenuated, the aperture disposed at a predetermined angle relative to the axis of symmetry.

12. The aircraft position light assembly of claim 11, wherein the aperture has a predetermined diameter.

13. The aircraft position light assembly of claim 11, wherein the hemispherical dome comprises a thermoplastic resin embedded with a thermoplastic dye.

14. The aircraft position light assembly of claim 11, further comprising:
    a transparent cover coupled to the housing and disposed such that the visible light emitted from the non-IR LEDs passes therethrough.

15. The aircraft position light assembly of claim 14, further comprising:
    an opaque cover coupled to the housing and abutting a portion of the transparent cover, the opaque cover having a lens opening formed therein in which the lens is disposed.

16. The aircraft position light assembly of claim 11, wherein:
- the housing includes an attachment portion and a mount portion;
- the attachment portion is adapted to attach the housing to a vehicle;
  - the mount portion extends from, and has a mount surface that is disposed at a predetermined angle relative to, the attachment portion; and
- the LED is coupled to the mount portion.

17. The aircraft position light assembly of claim 16, further comprising:
- a printed circuit board disposed on the mount surface and having the LED connected thereto.

18. A light assembly, comprising:
- a housing having a lens mounted thereon;
- a light emitting diode (LED) mounted within the housing, the LED operable to emit light within a predetermined range of wavelengths and at an emission intensity toward the lens; and
- a hemispherical dome mounted within the housing between the LED and the lens, the hemispherical dome comprising a material that attenuates the emission intensity by a predetermined magnitude, the hemispherical dome having an aperture formed therein and through which a portion of the light emitted from the LED may pass unattenuated, the aperture having a predetermined diameter.

19. The light assembly of claim 18, wherein:
- the hemispherical dome has an apex and an axis of symmetry that extends through the apex; and
- the aperture is disposed at a predetermined angle relative to the axis of symmetry.

20. The light assembly of claim 18, wherein:
- the hemispherical dome comprises a thermoplastic resin embedded with a thermoplastic dye; and
- the predetermined range of wavelengths is an infrared wavelength range.

\* \* \* \* \*